United States Patent [19]
Imai et al.

[11] Patent Number: 5,973,812
[45] Date of Patent: Oct. 26, 1999

[54] OPTICAL TRANSMITTER AND OPTICAL COMMUNICATION SYSTEM

[75] Inventors: Keisuke Imai; Yasunori Nagakubo, both of Kawasaki, Japan

[73] Assignee: Fujitsu Limited, Kawasaki, Japan

[21] Appl. No.: 08/874,666

[22] Filed: Jun. 13, 1997

[30] Foreign Application Priority Data

Nov. 25, 1996 [JP] Japan ................................ 8-313488

[51] Int. Cl.⁶ .................................................. H04B 10/00
[52] U.S. Cl. .................... 359/161; 359/182; 359/183; 359/173
[58] Field of Search .................... 359/161, 173, 359/181–183, 188, 195, 160, 134

[56] References Cited

U.S. PATENT DOCUMENTS

| | | | |
|---|---|---|---|
| 5,329,396 | 7/1994 | Fishman et al. | 359/161 |
| 5,420,868 | 5/1995 | Chraplyvy | 359/188 |
| 5,473,461 | 12/1995 | Miremadi . | |
| 5,477,368 | 12/1995 | Eskildsen et al. | 359/188 |
| 5,550,667 | 8/1996 | Krimmel et al. | 359/180 |
| 5,566,381 | 10/1996 | Korotky | 359/183 |

FOREIGN PATENT DOCUMENTS

| | | |
|---|---|---|
| 0 099 632 | 2/1984 | European Pat. Off. . |
| 0 292 117 | 11/1988 | European Pat. Off. . |
| 7-92510 | 4/1995 | Japan . |
| 2 302 468 | 1/1997 | United Kingdom . |
| 97/42052 | 11/1997 | WIPO . |

*Primary Examiner*—Kinfe-Michael Negash
*Attorney, Agent, or Firm*—Staas & Halsey

[57] ABSTRACT

An optical transmitter and an optical communication system, each for providing a good transmission characteristic of a main signal and allowing suppression of SBS (stimulated Brillouin scattering). The optical transmitter comprises a light source for outputting a carrier beam, an optical modulator for modulating the carrier beam based on a main signal and sending out an optical signal into an optical fiber transmission line, an oscillator for outputting a low frequency signal, a first circuit for frequency or phase modulating the carrier beam based on the low frequency signal, and a second circuit for superposing an opposite phase signal having a phase opposite to that of the low frequency signal with the main signal and supplying a resulting signal to the optical modulator.

17 Claims, 19 Drawing Sheets

F I G. 5
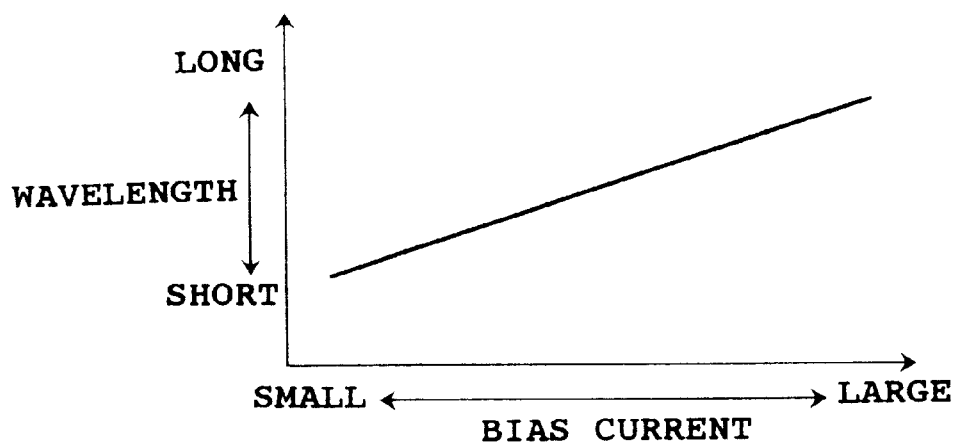

F I G. 6
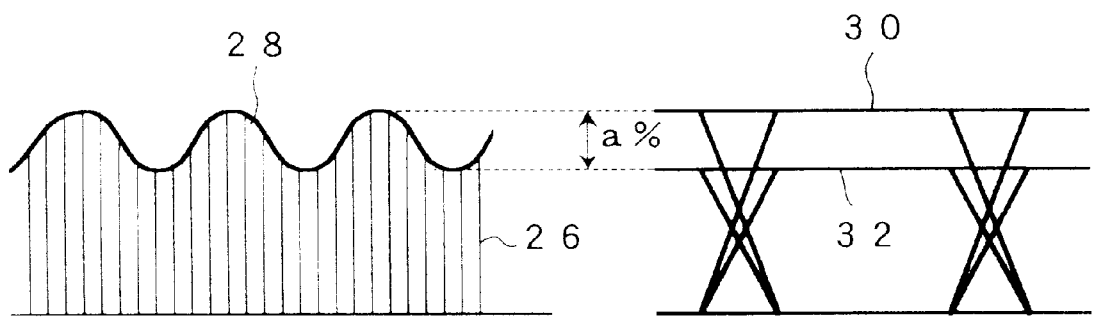

OPTICAL TRANSMITTER AND OPTICAL COMMUNICATION SYSTEM

BACKGROUND OF THE INVENTION

1. Field of the Invention

This invention relates generally to suppression of stimulated Brillouin scattering which occurs in an optical fiber transmission line, and more particularly to an optical transmitter and an optical communication system which allow such suppression.

2. Description of the Related Art

In recent years, it has become possible to obtain an optical signal which is high in power and low in chirping by using an optical amplifier and an external optical modulator. When an optical signal which is high in power and coherent in this manner is to be transmitted by means of an optical fiber transmission line, stimulated Brillouin scattering (SBS) occurs in a fiber and degrades the transmission quality, and accordingly, a countermeasure against it is demanded.

An optical transmitter is known wherein bias current for inducing laser oscillations is supplied to a laser diode and modulation current is superposed with the bias current so as to directly obtain a modulated optical signal. Another optical transmitter is known wherein fixed or controlled bias current is supplied to a laser diode and continuous wave (CW) light outputted from the laser diode is modulated by an external optical modulator.

Meanwhile, it has been proposed to further frequency or phase modulate, for example, an intensity modulated optical signal in order to suppress SBS occurring in an optical fiber transmission line. The bandwidth (spectral line width) of an optical signal is expanded by frequency or phase modulation, and consequently, a threshold value with which SBS occurs increases. As a result, the SBS is suppressed.

In order to perform, for example, frequency modulation of a light beam outputted from a laser diode, it is effective to superpose a low frequency signal with bias current to be supplied to the laser diode. However, the superposition of the low frequency signal with the bias current not only modulates the frequency (wavelength) of the light beam, but also modulates the intensity (power) of the light beam. Such generation of an intensity modulated component with a low frequency signal gives rise to a problem that it degrades the transmission characteristic of the main signal and, for example, long haul transmission becomes difficult.

An optical transmitter has been proposed which includes means for suppressing an intensity modulated component by a low frequency signal described above (for example, Japanese Patent Laid-Open Application No. Heisei 7-92510). This optical transmitter includes a circuit for modulating injection current to a semiconductor laser light source with a suppression signal so that output light of the semiconductor laser light source may be phase or frequency modulated, a first external modulator for intensity modulating the intensity of the output light of the semiconductor laser light source with a signal to be transmitted, and a second external modulator for canceling an intensity modulated component by the suppression signal. However, according to this prior art, one external modulator is required for each of modulation with a signal to be transmitted and modulation for cancellation of an intensity modulated component by a suppression signal, and accordingly, this gives rise to a problem in that the construction of the optical transmitter is complicated due to the requirement for the two external modulators and peripheral circuits for them.

SUMMARY OF THE INVENTION

Accordingly, it is an object of the present invention to provide an optical transmitter with a simple construction which provides a good transmission characteristic of a main signal and can suppress SBS.

It is another object of the present invention to provide a concrete optical communication system which provides a good transmission characteristic of a main signal and can suppress SBS.

According to a first aspect of the present invention, there is provided an optical transmitter which has a light source for outputting a light carrier beam. An optical modulator is operatively connected to the light source. The optical modulator modulates the light carrier beam based on a main signal to produce an optical signal. The optical signal is sent out into an optical transmission line. In order to suppress SBS, an oscillator which outputs a low frequency signal having a frequency lower than that of the main signal is used. The light carrier beam is frequency or phase modulated based on the low frequency signal so that a threshold value with which the optical signal undergoes SBS in the optical transmission line may increase. Then, a signal for suppressing intensity modulation of the light carrier beam which arises from the frequency or phase modulation is superposed with the main signal.

With this construction, since the light carrier beam is frequency or phase modulated based on the low frequency signal, suppression of SBS is possible, and since the signal for suppressing intensity modulation of the light carrier beam which arises from the frequency or phase modulation is superposed with the main signal, a good transmission characteristic of the main signal is obtained. Further, since only one optical modulator is required, the construction of the optical transmitter is simplified.

According to a second aspect of the present invention, there is provided an optical transmitter which has a light source for outputting a light beam into an optical transmission line. The light beam is amplified by an optical amplifier. The optical amplifier has a variable gain for the light beam. In order to suppress SBS, an oscillator which outputs a low frequency signal is used. The light beam is frequency or phase modulated based on the low frequency signal so that a threshold value with which the light beam undergoes SBS in the optical transmission line may increase. The gain of the optical amplifier is controlled so that intensity modulation of the optical beam which arises from the frequency or phase modulation may be suppressed.

By such control of the gain of the optical amplifier, the transmission characteristic of the main signal is improved, for example, where the light beam is modulated with a main signal. Further, since only one optical amplifier can be used for both of amplification of an optical signal and modulation for suppression of an intensity modulated component, the construction of the optical transmitter of a high output power suitable for long haul transmission can be simplified.

According to a third aspect of the present invention, there is provided an optical communication system which comprises an optical transmitter for outputting an optical signal, an optical transmission line operatively connected to the optical transmitter for transmitting the optical signal, and an optical receiver operatively connected to the optical transmission line for receiving the optical signal. The optical transmitter includes an oscillator for outputting a low frequency signal, and means for frequency or phase modulating the optical signal based on the low frequency signal so that a threshold value with which the optical signal undergoes SBS in the optical transmission line may increase. The optical receiver includes means for suppressing intensity modulation of the optical signal which arises from the frequency or phase modulation by the optical transmitter. By adoption of such an optical receiver, for example, where the optical signal is modulated with a main signal, the transmission characteristic of the main signal is improved.

It is to be noted that, in the present application, the expression that a certain element and another element are operatively connected to each other includes a case wherein those elements are connected directly to each other and further includes another case wherein those elements are provided with such a degree of relevancy that an optical signal or an electric signal can be communicated between them.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 5 is a graph illustrating a relationship between the wavelength and the bias current of a laser diode;

FIG. 6 is a view for explaining waveform interference;

DETAILED DESCRIPTION OF THE PREFERRED EMBODIMENTS

In the following, preferred embodiments of the present invention are described in detail with reference to the accompanying drawings. Same reference symbols are applied to substantially same elements through all figures.

Figure 1:
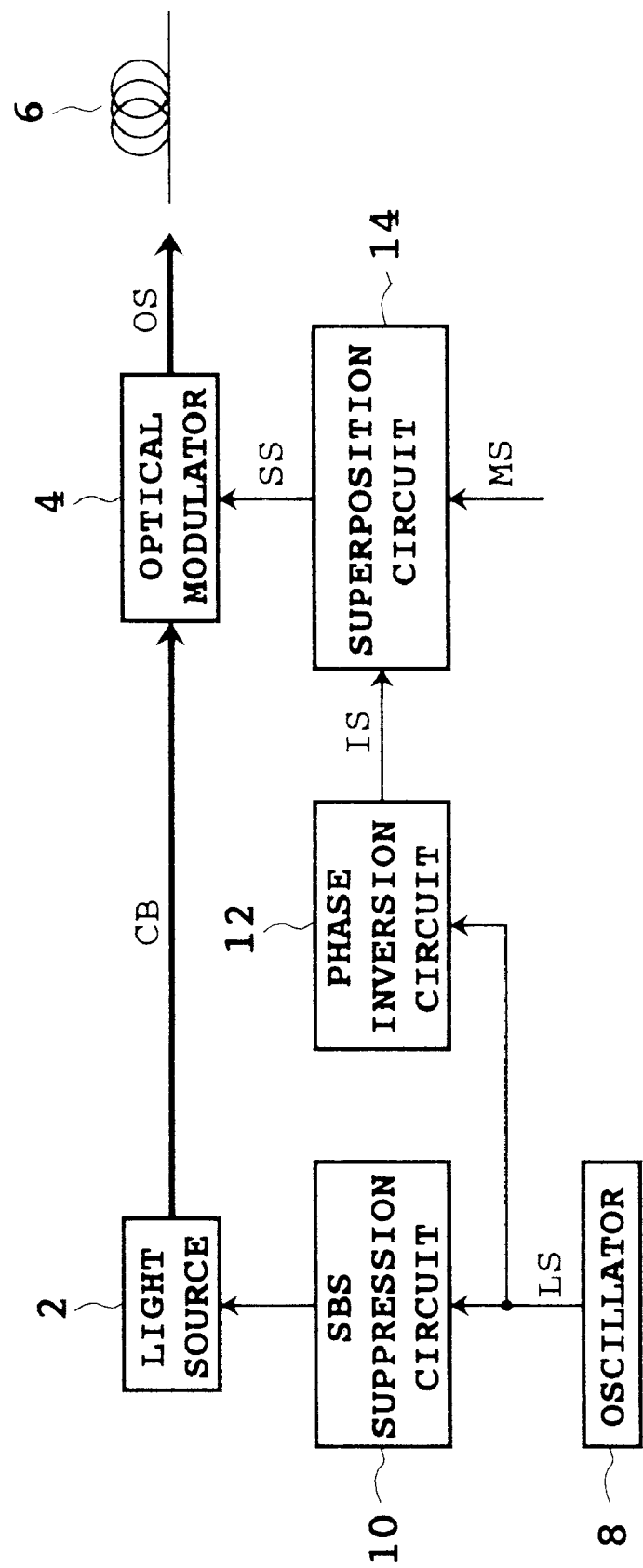
FIG. 1 is a block diagram showing a first basic construction of an optical transmitter according to the present invention.

Referring to FIG. 1, there is shown a first basic construction of an optical transmitter according to the present invention. A light source 2 outputs a carrier beam CB in the form of continuous wave (CW) light. The carrier beam CB is modulated based on a main signal MS by an optical modulator 4, and as a result, an optical signal OS is sent out from the optical modulator 4 into an optical fiber transmission line 6. An oscillator 8 outputs a low frequency signal LS which has a frequency lower than that of the main signal MS. An SBS suppression circuit 10 frequency modulates or phase modulates the carrier beam CB based on the low frequency signal LS so that a threshold value with which the optical signal OS undergoes SBS in the optical fiber transmission line 6 may increase.

For convenience of description, frequency or phase modulation is defined as angle modulation, and the following description proceeds using the definition.

A phase inversion circuit 12 receives the low frequency signal LS and produces an opposite phase signal (inversed phase signal) IS having a phase opposite to that of the low frequency signal LS. The opposite phase signal IS is superposed with the main signal MS by a superposition circuit 14, and a superposed signal SS obtained as a result is supplied to the optical modulator 4.

Increase of returning light by SBS is described with reference to FIG. 2. In a graph shown in FIG. 2, the axis of ordinate indicates an output optical power regarding the optical fiber transmission line 6, and the axis of abscissa indicates an input optical power (dBm) to the optical fiber transmission line 6. Reference numeral 16 denotes a relationship between the power of light outputted in a forward direction (direction from the optical transmitter of FIG. 1 toward the receiving side) from the optical fiber transmission line 6 and the input optical power, and reference numeral 18 denotes a relationship between the power of returning light outputted in the opposite direction (direction from the receiving side toward the optical transmitter) from the optical fiber transmission line 6 and the input optical power.

If it is assumed that no SBS occurs in the optical fiber transmission line 6, the output optical powers increase in proportion to the input optical powers both in the forward direction and the opposite direction as indicated individually by broken lines, and the ratio between the output optical powers in the forward direction and the opposite direction is substantially fixed. This is because only Fresnel reflection at an optical connector end face and so forth makes a factor of production of returning light. Actually, however, if the input optical power exceeds a certain threshold value, then SBS occurs in the optical fiber transmission line 6 and the power of the returning light increases suddenly. As a result, the optical power which can be transmitted in the forward direction becomes saturated.

Figure 2:
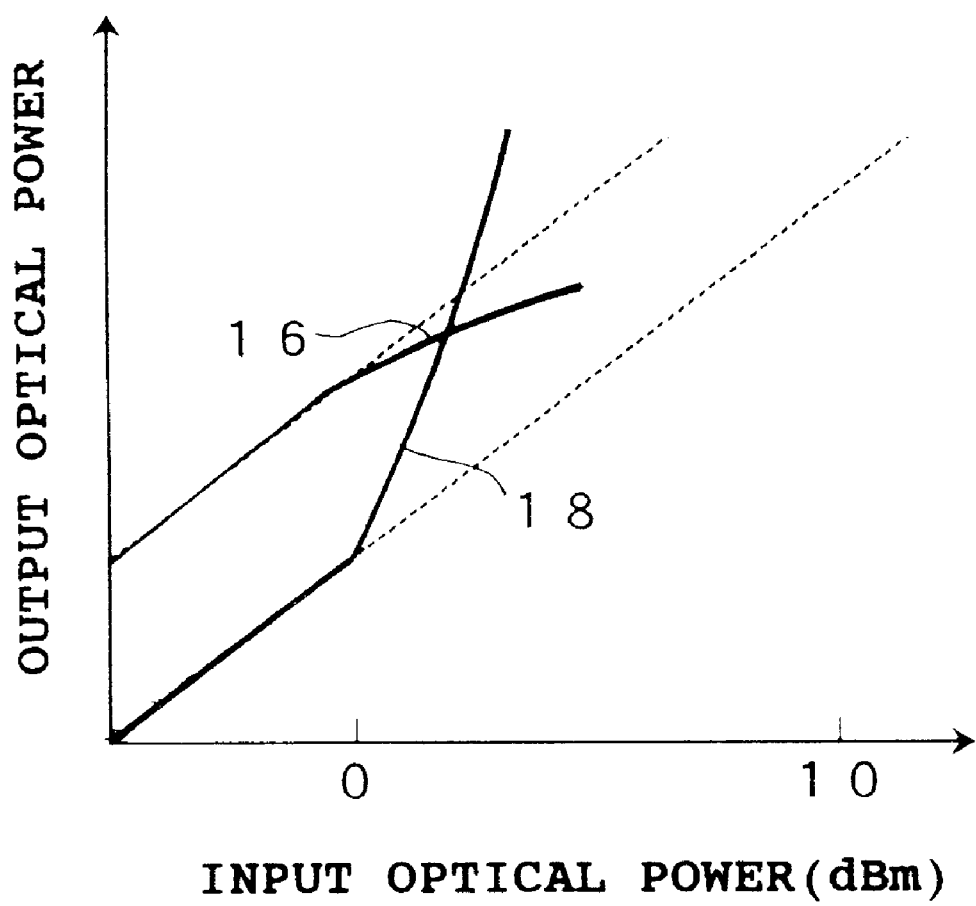
FIG. 2 is a graph for explaining increase of returning light by SBS (stimulated Brillouin scattering)

It is to be noted that, while the threshold value (SBS threshold value) with which SBS occurs depends upon the type of the optical fiber transmission line 6 or the coding system of the main signal MS, in the example of FIG. 2, the SBS threshold value is approximately 0 dBm and this threshold value can be made high by an action of the SBS suppression circuit 10. This is described in detail.

Figure 3A:
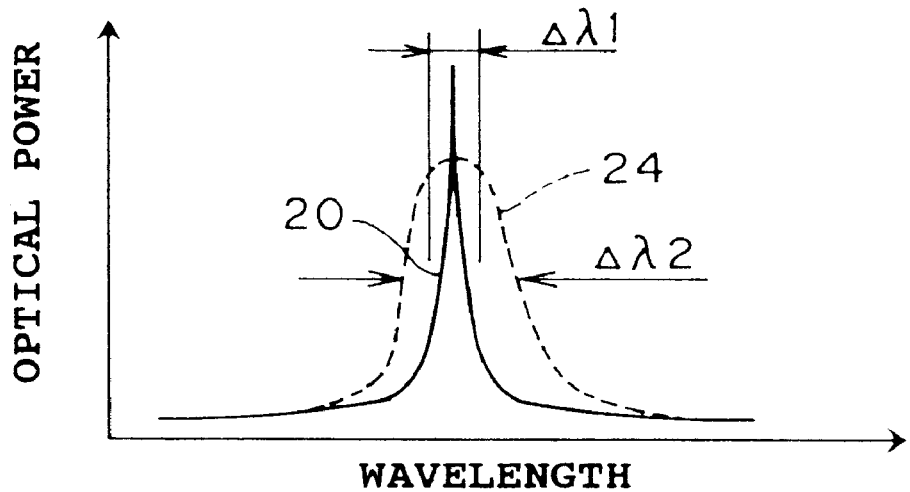
FIGS. 3A and 3B are views for explaining increase of the bandwidth by a low frequency signal.
Figure 3B:
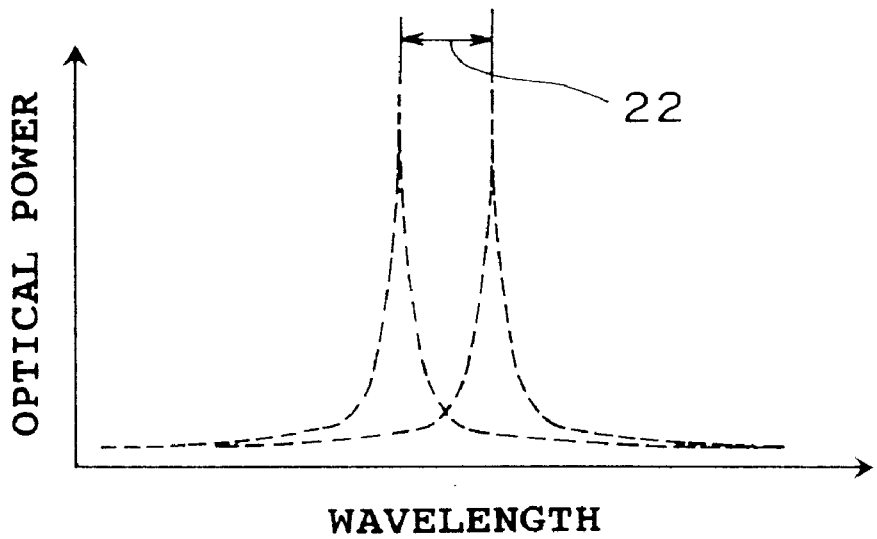
Figure 4:
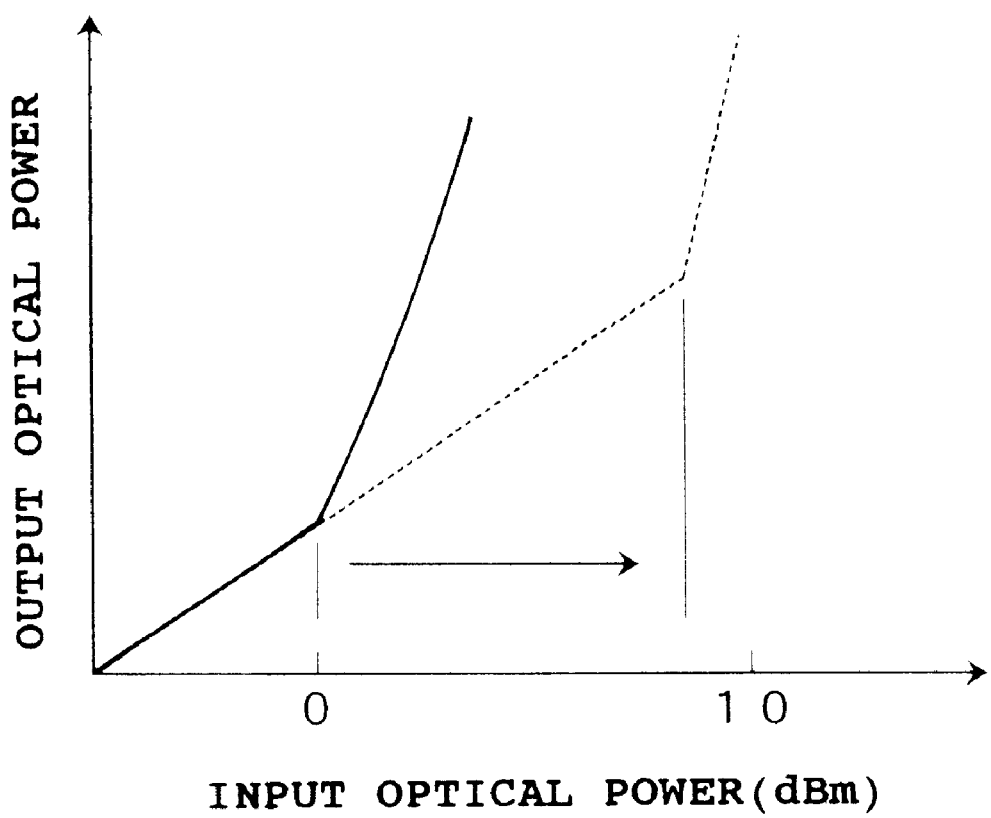
FIG. 4 is a view for explaining increase of an SBS threshold value by expansion of the bandwidth.

Expansion of the bandwidth of the optical signal OS with the low frequency signal LS is described with reference to FIGS. 3A and 3B. In both of FIGS. 3A and 3B, the axis of ordinate indicates the optical power and the axis of abscissa indicates the wavelength. Denoted by reference numeral 20 in FIG. 3A is a spectrum of the optical signal OS outputted from the optical modulator 4 when the SBS suppression circuit 10 is inoperative. Since the optical signal OS undergoes modulation (for example, intensity modulation) based on the main signal MS, the spectrum 20 has a certain bandwidth $\Delta\lambda1$. If the SBS suppression circuit 10 operates, then the center wavelength of the optical signal OS varies periodically in accordance with the low frequency signal LS as denoted by reference numeral 22 in FIG. 3B, and as a result, as denoted by reference numeral 24 in FIG. 3A, the bandwidth of the optical signal OS is expanded to $\Delta\lambda2$. Then, since the bandwidth is increased, the SBS threshold value in the optical fiber transmission line 6 increases as shown in FIG. 4. In the example shown, the threshold value increases from 0 dBm to 9 dBm.

The SBS suppression circuit 10 operates, for example, upon a laser diode which is usually used as the light source 2.

Referring to FIG. 5, there is illustrated a relationship between the wavelength and the bias current of an ordinary laser diode (LD). As the bias current increases, the wavelength becomes longer. It is to be noted here that, when the bias current varies, not only the wavelength of CW light outputted from the laser diode varies, but also the power of the CW light varies. Accordingly, waveform interference becomes liable to occur with a main signal by operation of the SBS suppression circuit 10, and the bit error rate (BER) upon reception is degraded.

FIG. 6 is a view for explaining waveform interference mentioned above. A left side portion of FIG. 6 shows an example of waveform of the optical signal OS, and a right side portion shows an example of eye pattern of a demodulated signal. The optical signal OS has a waveform wherein, for example, a low frequency component 28 of a low rate based on the low frequency signal LS is superposed with a main signal component 26 of a high rate. The frequencies of the main signal component 26 and the low frequency component 28 are, for example, several GHz and several hundreds KHz, respectively. If the variation of the optical power by the low frequency component 28 is a % of an average optical power, then the high level of the demodulated signal (for example, NRZ coded) varies within a range defined by reference numerals 30 and 32, and the variation width of it is a % of the eye opening. In order to increase the SBS threshold value, it is effective to increase the amplitude of the low frequency component 28. However, if the amplitude of the low frequency component 28 is increased, then the high level of the demodulated signal is liable to become indefinite, and the BER is degraded and this makes a factor of jitters upon clock regeneration. If the BER is degraded or jitters are produced in this manner, then it becomes difficult to maintain a good transmission characteristic of a main signal.

In the optical transmitter of FIG. 1, in order to cancel the intensity modulation of the optical signal OS with the low frequency component 28 (refer to FIG. 6), the phase inversion circuit 12 and the superposition circuit 14 are provided. A principle of the cancellation will be described in more detail through a following embodiment.

Figure 7:
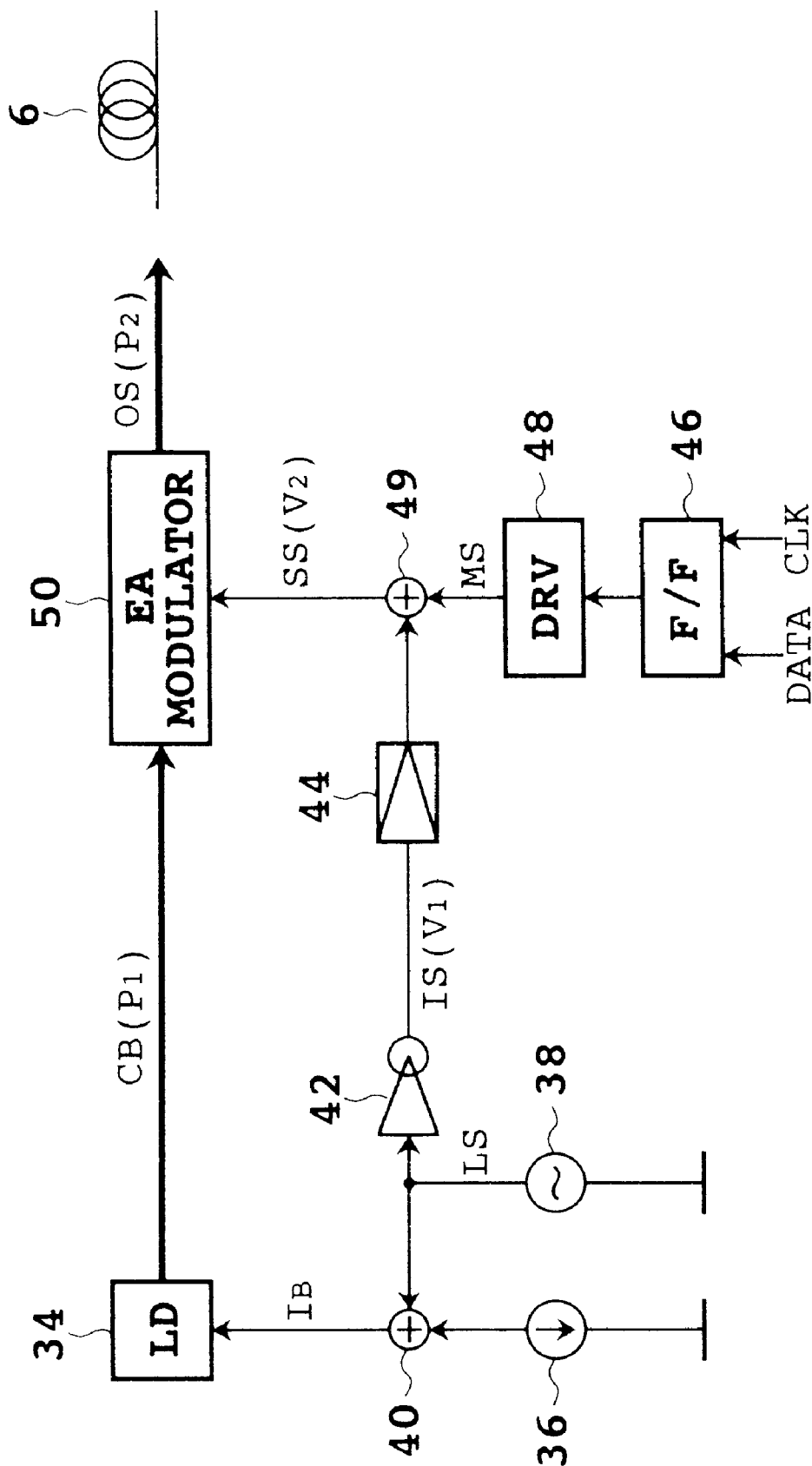
FIG. 7 is a block diagram showing an embodiment of the first basic construction of the optical transmitter according to the present invention.

Referring to FIG. 7, there is shown an embodiment of the first basic construction of the optical transmitter according to the present invention. In a corresponding relationship to the light source 2 of FIG. 1, a laser diode (LD) 34 and a constant current source 36 for driving the laser diode 34 are provided. A low frequency signal LS outputted from a low frequency signal source 38 (which corresponds to the oscillator 8 of FIG. 1) is superposed with constant current produced by the constant current source 36 by an adder 40, and as a result, bias current $I_B$ is supplied from the adder 40 to the laser diode 34. The adder 40 corresponds to the SBS suppression circuit 10 of FIG. 1. In order to invert the phase of the low frequency signal LS from the low frequency signal source 38, an inverter 42 is provided. The amplitude of the opposite phase signal IS obtained as a result of the phase inversion is adjusted by an amplifier 44. Data (DATA) to be transmitted and a clock (CLK) for waveform shaping are supplied to a flip-flop circuit (F/F) 46, and a waveform shaped data signal is supplied from the flip-flop circuit 46 to a driver (DRV) 48. An output signal of the driver 48 makes the main signal MS for modulation. The opposite phase signal IS whose amplitude has been adjusted by the amplifier 44 is superposed with the main signal MS by an adder 49, and a superposed signal SS obtained as a result of the superposition is supplied to an electric field absorption type modulator (EA modulator) 50. The EA modulator 50 absorbs a carrier beam CB outputted from the laser diode 34 in response to an applied voltage and outputs an optical signal OS. The optical signal OS is sent out into the optical fiber transmission line 6.

Figure 8A:
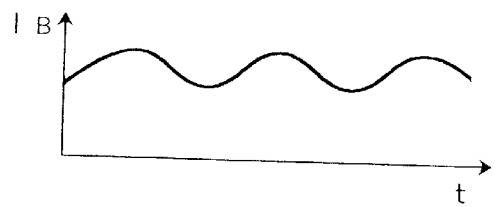
FIGS. 8A to 8E show waveforms at different portions in FIG. 7.

Referring to FIGS. 8A to 8E, waveforms at the different portions in FIG. 7 is shown. FIG. 8A shows the waveform of the bias current $I_B$ supplied from the adder 40 to the laser diode 34, FIG. 8B the waveform of the power $P_1$ of the carrier beam CB outputted from he laser diode 34, FIG. 8C the waveform of the voltage value $V_1$ of the opposite phase signal IS, FIG. 8D the waveform of the voltage value $V_2$ of the superposed signal SS supplied to the EA modulator 50, and FIG. 8E the waveform of the power $P_2$ of the optical signal OS outputted from the EA modulator 50.

Figure 8B:
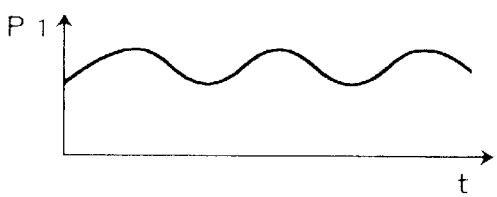
Figure 8C:
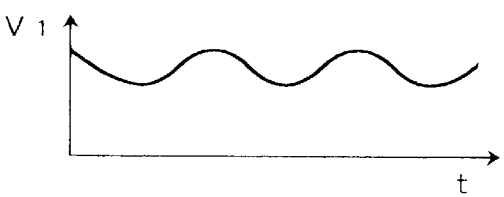
Figure 8D:
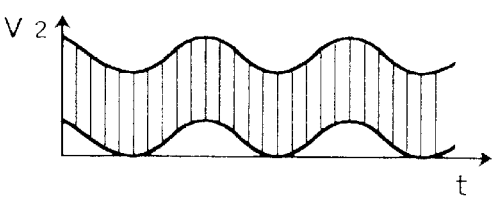

As shown in FIG. 8A, the bias current $I_B$ supplied to the laser diode 34 varies periodically in accordance with the low frequency signal LS. While, in the present embodiment, the low frequency signal LS is a sine wave, the low frequency signal LS may be a chopping wave. If the bias current $I_B$ varies periodically in this manner, the wavelength of the carrier beam CB varies periodically in accordance with the relationship between the wavelength and the bias current of FIG. 5 and the SBS threshold value increases. The power $P_1$ of the carrier beam CB varies in synchronism with the bias current $I_B$ as shown in FIG. 8B. The waveform of the opposite phase signal IS has an opposite phase to that of the waveform of the bias current $I_B$ as shown in FIG. 8C. In other words, the phase difference between them is 180 degrees. If the opposite phase signal IS is superposed with the main signal MS by the adder 49, then since the main signal MS has a fixed amplitude, both of the high level and the low level of the superposed signal SS vary in synchronism with the opposite phase signal IS as shown in (D) of FIG. 8D. The amplitude of the opposite phase signal IS superposed with the main signal MS is set such that the variation of the power $P_1$ of the carrier beam CB shown in FIG. 8B is canceled by the variation of the high level of the superposed signal SS shown in FIG. 8D. As a result, the high level of the optical signal OS becomes fixed as shown in FIG. 8E.

Further, in the present embodiment, since the EA modulator 50 has a particular operation characteristic, the variation of the low level of the optical signal OS is almost eliminated.

Figure 9:
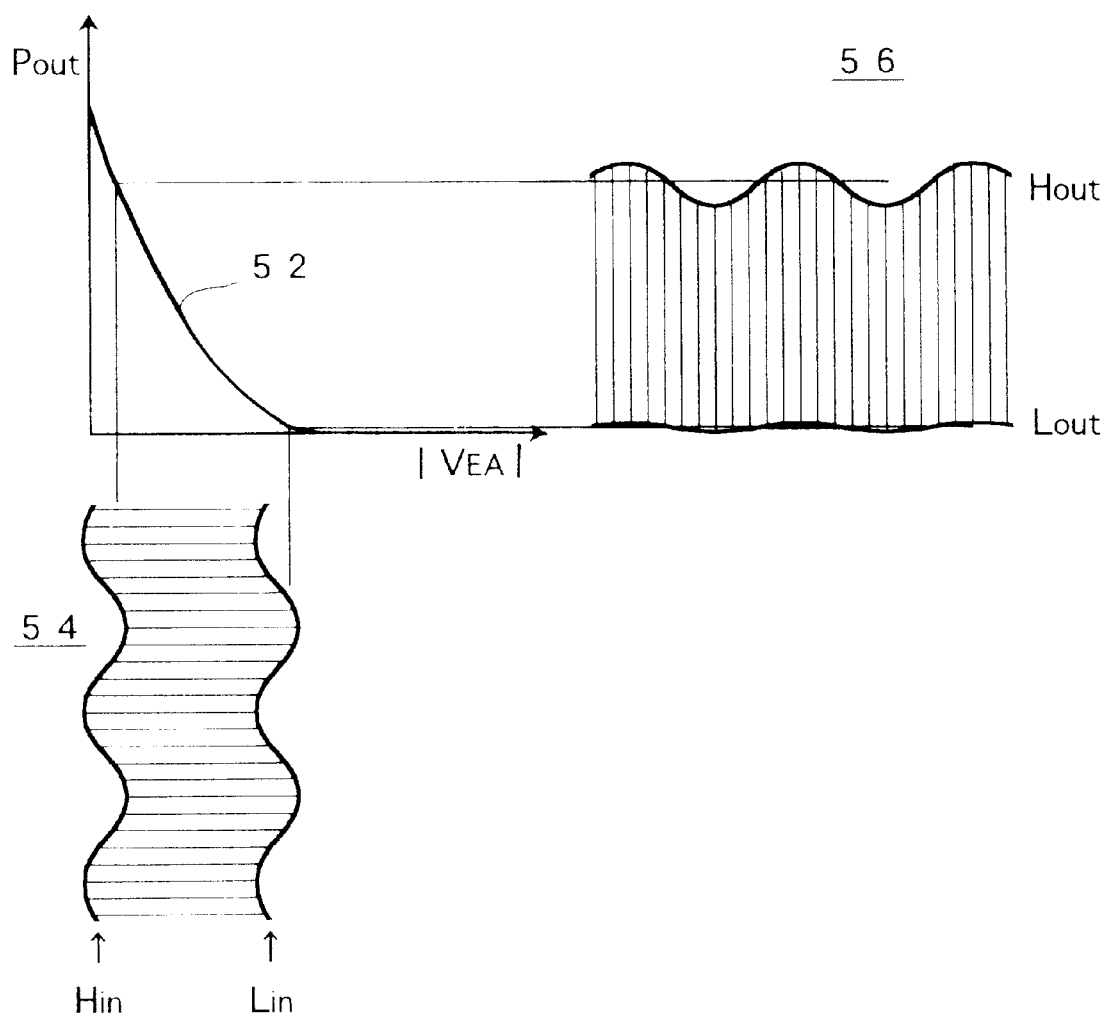
FIG. 9 is a view illustrating an operation characteristic of an electric field absorption type modulator.

Referring to FIG. 9, the operation characteristic of the EA modulator 50 is shown. The EA modulator 50 has a characteristic curve 52 wherein the output power $P_{OUT}$ decreases as the absolute value $|V_{EA}|$ of the applied voltage increases, and the inclination of the characteristic curve 52 decreases as $|V_{EA}|$ increases. For example, the characteristic curve 52 is approximated to a parabola. In this instance, by making the high level $H_{in}$ and the low level $L_{in}$ of an input electric signal waveform 54 correspond to a portion of the operation characteristic curve 52 at which the inclination is comparatively steep and another portion at which the inclination is comparatively gentle, respectively, the modulation efficiency for the low level $L_{in}$ can be made sufficiently low comparing with the modulation efficiency for the high level $H_{in}$. As a result, where a carrier beam of a fixed intensity is given, the variation of the low level $L_{out}$ of an output light waveform 56 can be made sufficiently small comparing with the variation of the high level $H_{out}$ of the output light waveform 56.

Figure 8E:
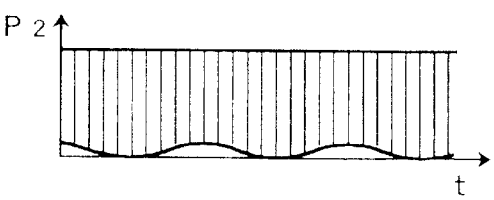

As described above, according to the embodiment of FIG. 7, since the opposite phase signal IS whose amplitude is adjusted suitably is superposed with the main signal MS, the high level of the optical signal OS can be made fixed as shown by FIG. 8E, and the waveform interference described with reference to FIG. 6 can be prevented.

Particularly, in the present embodiment, since the EA modulator 50 has such a particular operation characteristic as shown in FIG. 9, the variation of the low level of the optical signal OS can be made sufficiently small as shown in FIG. 8E, and waveform interference by the variation can be prevented effectively.

Figure 10:
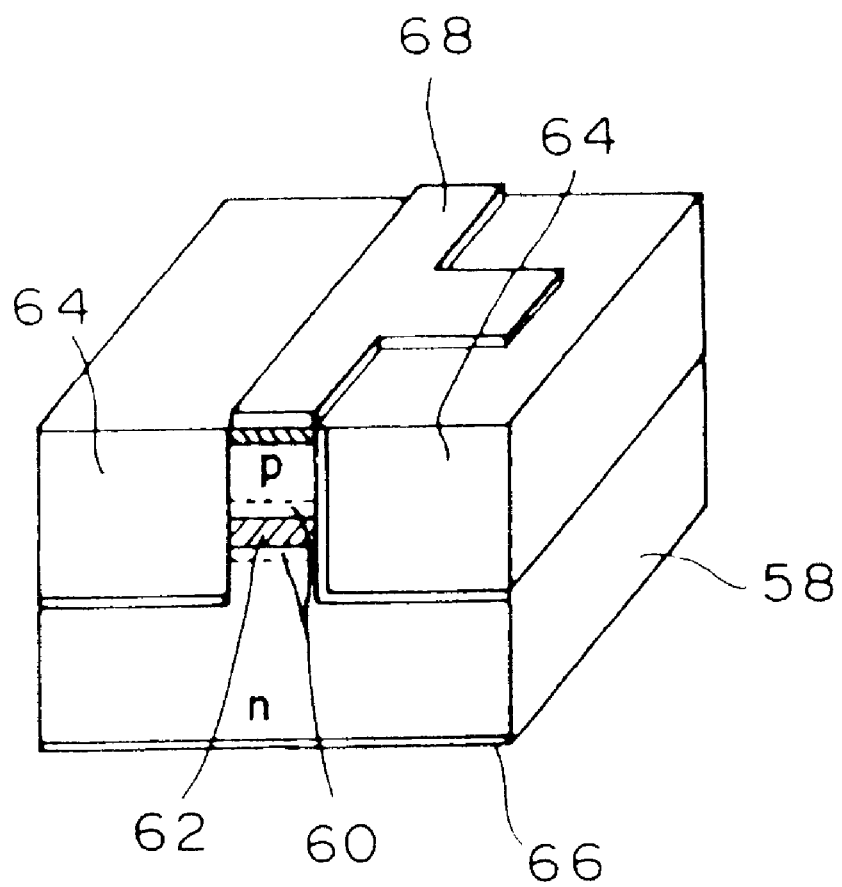
FIG. 10 is a perspective view showing an example of electric field absorption type modulator.

Referring to FIG. 10, an example of EA modulator which can be applied to the present invention is shown. This EA modulator has an absorption layer 62 formed from an InGaAsP (un-doped) bulk layer held between InGaAsP buffer layers 60 in a semiconductor chip 58. The thickness of the absorption layer 62 is adjusted in a production process, and the width is defined by polyimide layers 64 provided on the opposite sides of the absorption layer 62. In order to apply an electric field to the absorption layer 62, a grounding electrode 66 and a signal electrode 68 are provided. By varying the voltage applied between the electrodes 66 and 68, the absorption ratio of light of the absorption layer 62 varies, and consequently, the intensity modulation becomes possible.

Figure 11:
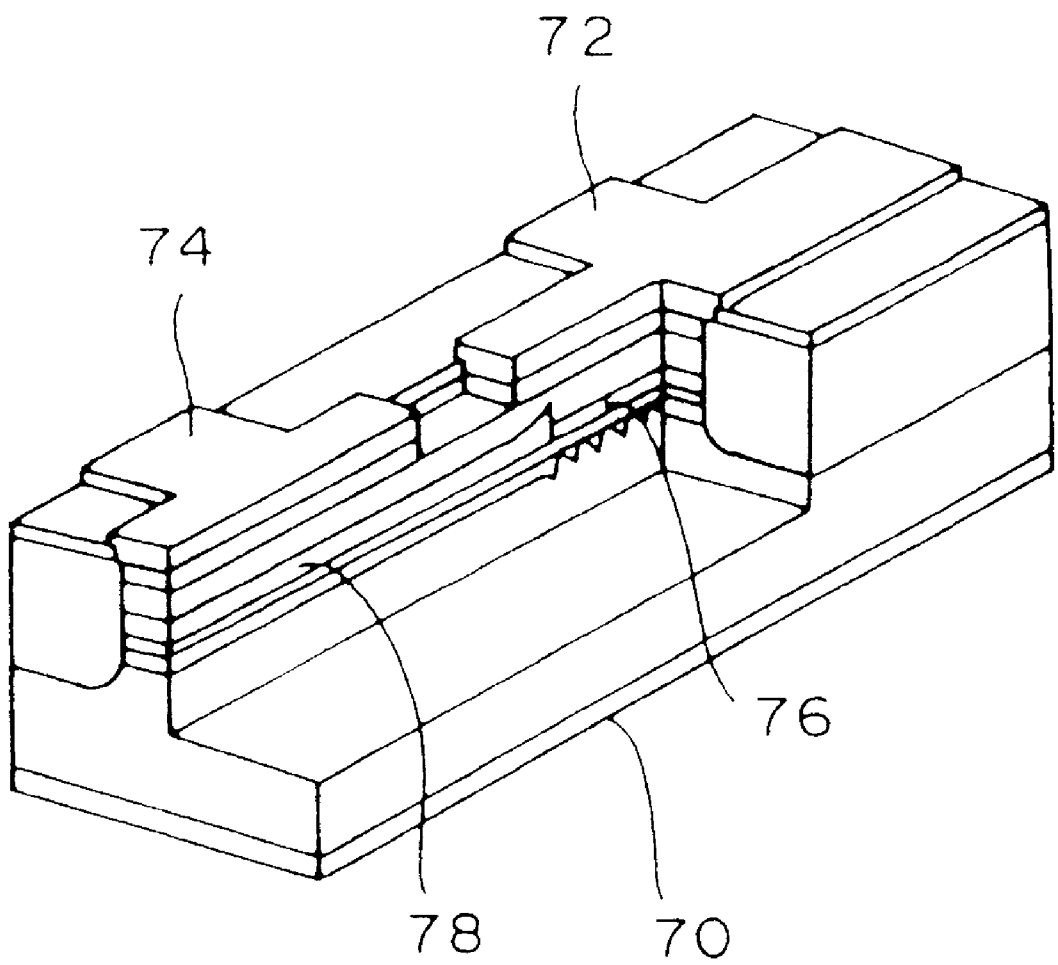
FIG. 11 is a sectional perspective view showing another example of electric field absorption type modulator.

Referring to FIG. 11, another example of EA modulator which can be applied to the present invention is shown. This EA modulator integrally has a laser diode as a light source. Reference numeral 70 denotes a grounding electrode, reference numeral 72 denotes an electrode for the laser diode, and reference numeral 74 denotes an electrode for the EA modulator. An active layer 76 which outputs a carrier beam is provided between the grounding electrode 70 and the electrode 72, and an absorption layer 78 is provided between the grounding electrode 70 and the electrode 74. A carrier beam generated by the active layer 76 is directly absorbed by the absorption layer 78 to effect intensity modulation.

An EA modulator which monolithically and integrally has a laser diode in this manner is very effective to achieve minimization and reduction in loss. For example, in the embodiment of FIG. 7, since the laser diode 34 and the EA modulator 50 can be provided as a single semiconductor chip, the necessity for an optical coupling circuit for the carrier beam CB is eliminated.

For the optical modulator 4 of FIG. 1, in addition to such an EA modulator as described above, a Mach-Zehnder type modulator having a waveguide structure can be used. Further, in order to increase the power of the optical signal OS to be sent out into the optical fiber transmission line 6, an optical amplifier may be provided between the light source 2 and the optical modulator 4 or between the optical modulator 4 and the optical fiber transmission line 6.

Figure 12:
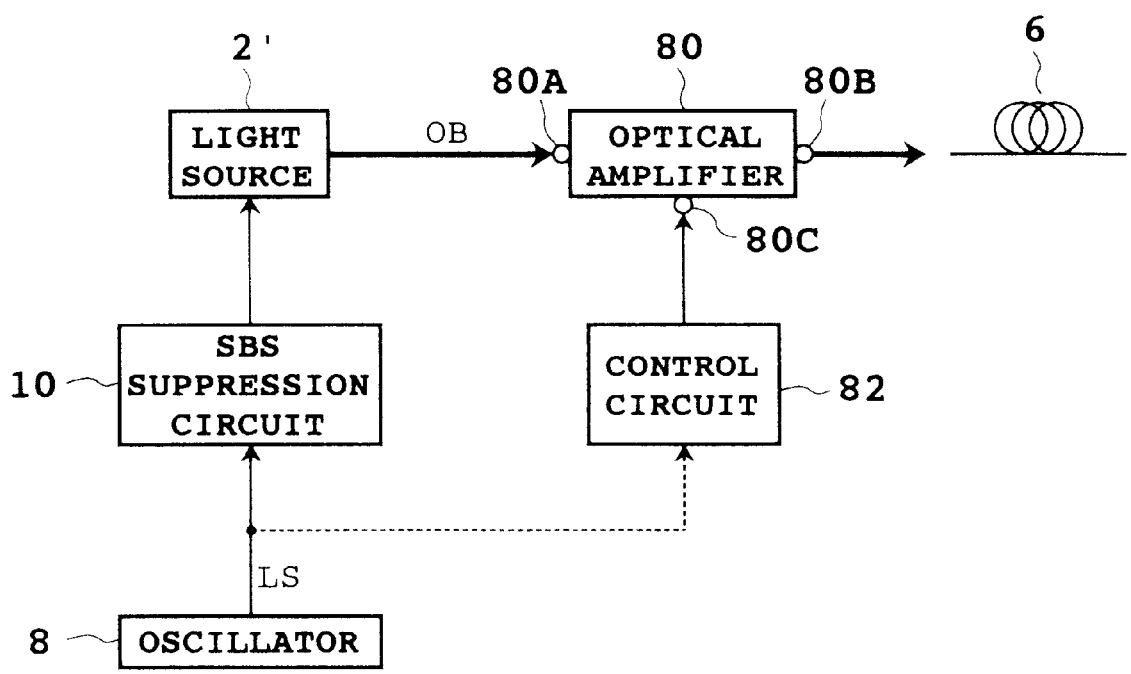
FIG. 12 is a block diagram showing a second basic construction of the optical transmitter according to the present invention.

Referring to FIG. 12, there is shown a second basic construction of the optical transmitter according to the present invention. This optical transmitter has a light source 2' for outputting a light beam (optical beam) OB to an optical fiber transmission line 6, and an optical amplifier 80 having an input port 80A and an output port 80B individually operatively connected to the light source 2' and the optical fiber transmission line 6, respectively.

Here, the reason why it is described that the light source 2' not outputs a carrier beam but outputs the light beam OB is that, while the first basic construction of FIG. 1 is limited by the use of the optical modulator 4, the second basic construction of FIG. 12 is not limited by the use of an optical modulator. For example, where direct modulation is applied to the light source 2', the light source 2' directly outputs an optical signal. Where the light source 2' outputs CW light, preferably an optical modulator is provided between the light source 2' and the optical amplifier 80 or between the optical amplifier 80 and the optical fiber transmission line 6.

In order to suppress SBS, an oscillator 8 for outputting a low frequency signal LS and an SBS suppression circuit 10 for angle modulating a light beam OB based on the low frequency signal LS in order to increase the SBS threshold value are provided. Where the light beam OB is modulated based on a main signal, the low frequency signal LS has a frequency lower than that of the main signal.

The optical amplifier 80 has a variable gain, and the gain of it is adjusted with a signal inputted to a port 80C. A control circuit 82 is connected to the port 80C. The control circuit 82 controls the gain of the optical amplifier 80 so that intensity modulation which arises from angle modulation of the light beam OB may be canceled. For example, the control circuit 82 receives the low frequency signal LS as indicated by a broken line, produces an opposite phase signal having a phase opposite to that of the low frequency signal LS and controls the gain of the optical amplifier 80 based on the opposite phase signal.

According to the second basic construction of the optical transmitter of FIG. 12, since the oscillator 8 and the SBS suppression circuit 10 are used, SBS is suppressed in a similar manner as with the first basic construction. Further, since the gain of the optical amplifier 80 is controlled so that an intensity modulated component produced by suppression of SBS may be suppressed, the transmission characteristic of the main signal is improved where the light beam OB is modulated based on the main signal. Further, since both of amplification of the light beam OB and modulation of the light beam OB for suppression of an intensity modulation component can be performed by the single optical amplifier 80, the construction of the optical transmitter is simplified. Since this optical transmitter includes the optical amplifier 80, a high output power can be obtained.

It is to be noted that, since the second basic construction of the optical transmitter shown in FIG. 12 has the optical amplifier 80, the optical power to be sent out into the optical fiber transmission line 6 can be raised sufficiently and long haul transmission is allowed. Suppression of SBS by the present invention is particularly effective where the light power supplied to the optical fiber transmission line 6 is high.

Figure 13:
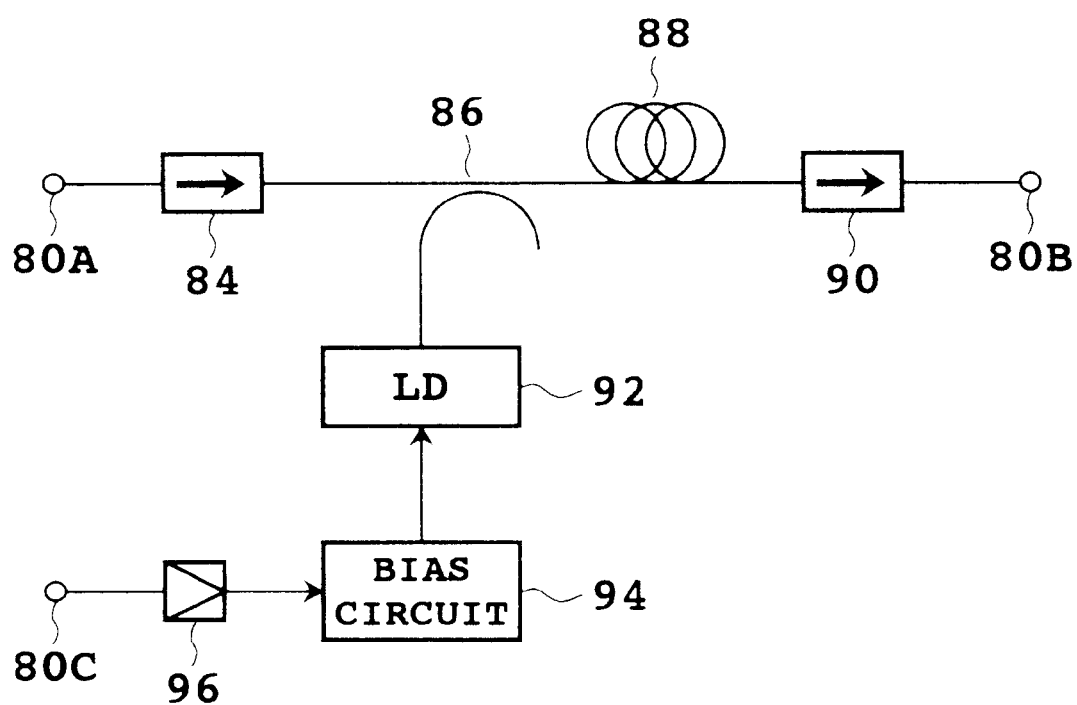
FIG. 13 is a block diagram of an EDFA (erbium-doped fiber amplifier)

Referring to FIG. 13, there is shown an EDFA (erbium-doped fiber amplifier) which can be used as the optical amplifier 80 of FIG. 12. An optical isolator 84, a WDM (wavelength division multiplexing) coupler 86, an EDF (erbium-doped fiber) 88 and another optical isolator 90 are connected in this order between the input port 80A and the output port 80B. The WDM coupler 86 is provided to supply pump light outputted from a laser diode 92 to the EDF 88. If a light beam is supplied to the EDF 88 after passing through the input port 80A, the optical isolator 84 and the WDM coupler 86 in this order in a condition wherein the EDF 88 is pumped with the pump light, the light beam is amplified by the EDF 88 and passes through the optical isolator 90 and the output port 80B in this order so that it is outputted from the EDFA.

Where the waveform of the light beam to be amplified is in a 1.55 $\mu$m band, the wavelength of the pump light is set, for example, to a 0.98 $\mu$m band or a 1.48 $\mu$m band. In order that such pump light may be outputted from the laser diode 92, bias current is supplied from a bias circuit 94 to the laser diode 92. When the opposite phase signal mentioned above is supplied to the port 80C, the amplitude of the opposite phase signal is adjusted by an amplifier 96, whereafter the opposite phase signal is supplied to the bias circuit 94. The bias circuit 94 varies the bias current to be supplied to the laser diode 92 in accordance with the opposite phase signal supplied thereto so that intensity modulation which arises from angle modulation is canceled. Since the gain of the EDFA can be adjusted with the power of the pump light in this manner, the intensity modulation arising from angle modulation can be canceled to prevent waveform interference on the receiving side.

Figure 14:
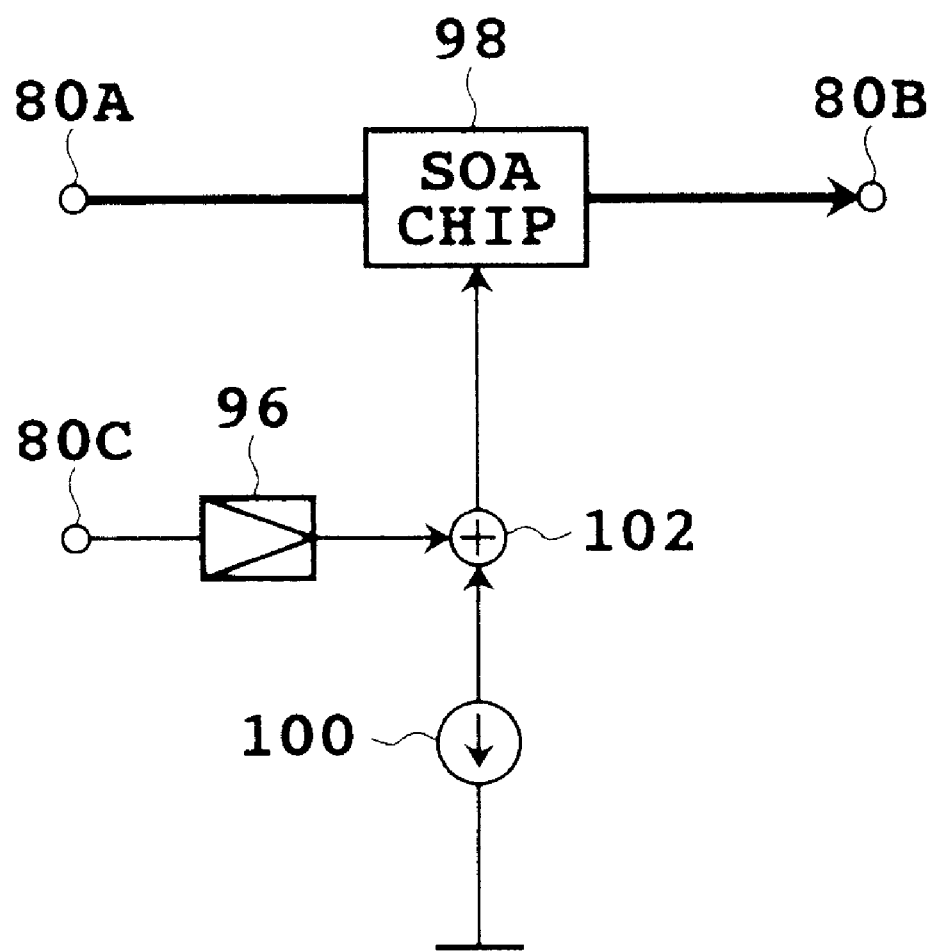
FIG. 14 is a block diagram of an SOA (semiconductor optical amplifier)

Referring to FIG. 14, there is shown an SOA (semiconductor optical amplifier) which can be used as the optical amplifier 80 of FIG. 12. This SOA has an SOA chip 98 operatively connected between the input port 80A and the output port 80B, and a constant current source 100 for driving the SOA chip 98. When the opposite phase signal is supplied to the port 80C, the opposite phase signal whose amplitude has been adjusted by the amplifier 96 is superposed with a constant current generated from the constant current source 100 by an adder 102, and the superposed signal is supplied to the SOA chip 98. Since the gain of the SOA can be adjusted with current supplied to the SOA chip 98, intensity modulation arising from angle modulation can be canceled by varying the gain based on the opposite phase signal in this manner.

Figure 15:
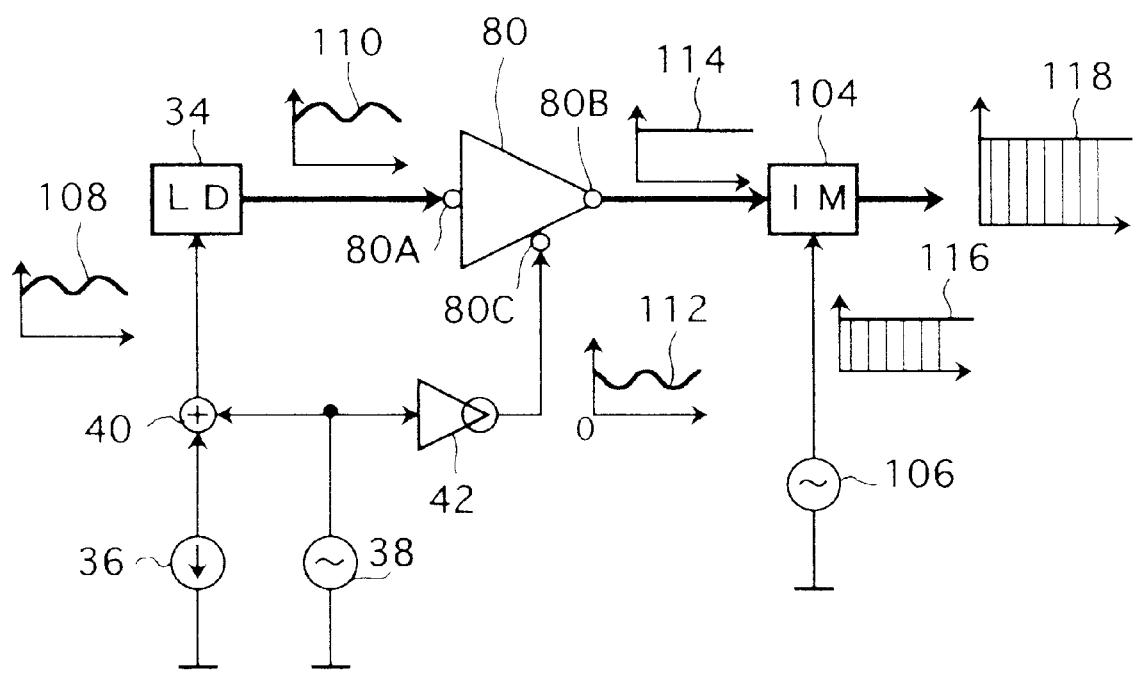
FIG. 15 is a block diagram showing an embodiment of the second basic construction of the optical transmitter according to the present invention.

Referring to FIG. 15, there is shown an embodiment of the second basic construction of the optical transmitter of the present invention. Similarly to the embodiment of FIG. 7, a laser diode 34, a constant current source 36, a low frequency signal source 38 and an adder 40 are used in order to suppress SBS, and an inverter 42 is used in order to obtain an opposite phase signal. A carrier beam outputted from the laser diode 34 is supplied to an input port 80A of an optical amplifier 80. The gain of the optical amplifier 80 is varied by an opposite phase signal supplied to a port 80C. The amplified carrier beam is supplied from an output port 80B of the optical amplifier 80 to an intensity modulator (IM) 104, by which it undergoes modulation with a main signal, whereafter it is sent out into an optical fiber transmission line not shown. A high rate signal source 106 for providing a main signal is connected to the intensity modulator 104.

Reference numeral 108 denotes a variation of the bias current supplied to the laser diode 34, and reference numeral 110 denotes a variation of the power of the carrier beam supplied from the laser diode 34 to the optical amplifier 80.

Those variations are same in phase. Reference numeral 112 denotes a waveform of the opposite phase signal supplied to the optical amplifier 80, and this is opposite in phase to the waveforms denoted by reference numerals 108 and 110. And, since the amplitude of the opposite phase signal is set so that intensity modulation arising from angle modulation of the carrier beam may be cancelled, the power of the carrier beam supplied from the optical amplifier 80 to the intensity modulator 104 is fixed as denoted by reference numeral 114. Reference numeral 116 denotes a waveform of the main signal supplied to the intensity modulator 104, and reference numeral 118 denotes a waveform of the optical signal outputted from the intensity modulator 104.

In the present embodiment, since the amplitude of the carrier beam supplied to the intensity modulator 104 is fixed, both of the envelope of the high level and the envelope of the low level of the optical signal obtained are fixed. Since the carrier beam outputted from the laser diode 34 is angle modulated, SBS is suppressed, and since the gain of the optical amplifier 80 is varied based on the opposite phase signal, intensity modulation arising from the angle modulation is canceled, and waveform interference on the receiving side is prevented.

Figure 16:
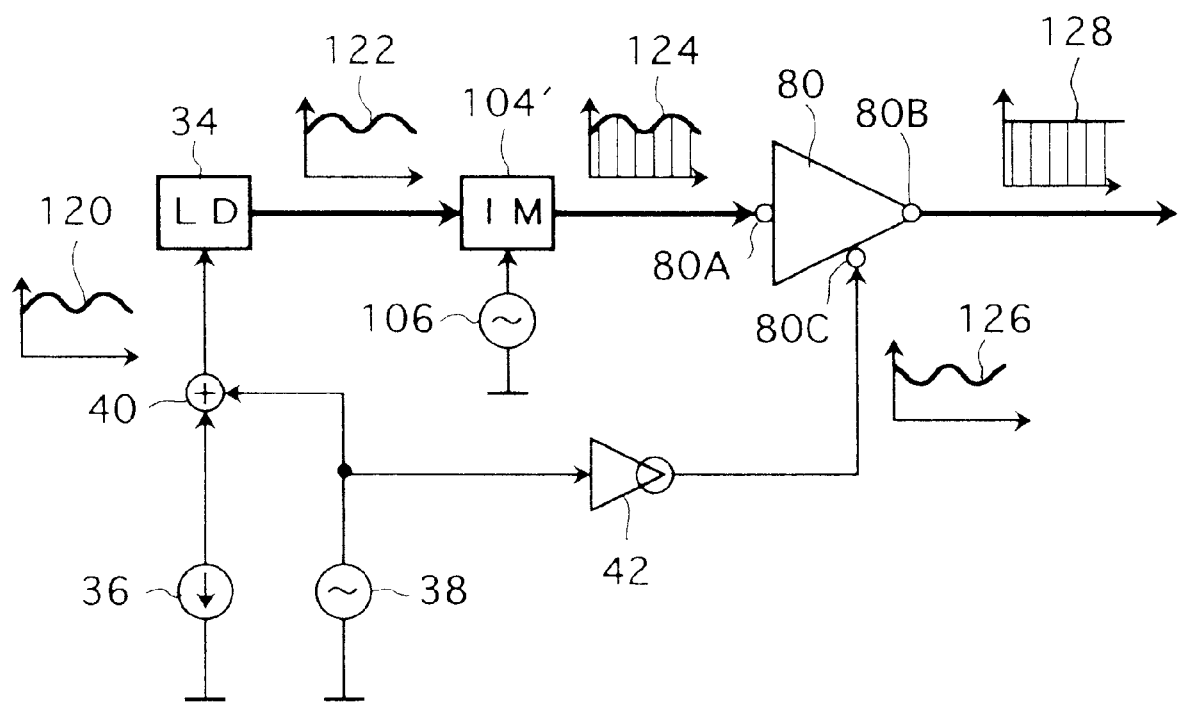
FIG. 16 is a block diagram showing another embodiment of the second basic construction of the optical transmitter according to the present invention.

Referring to FIG. 16, there is shown another embodiment of the second basic construction of the optical transmitter according to the present invention. Here, an intensity modulator 104' is operatively connected between a laser diode 34 and an optical amplifier 80. Similarly as in the embodiment of FIG. 15, in order to suppress SBS, a laser diode 34, a constant current source 36, a low frequency signal source 38 and an adder 40 are used, and an inverter 42 is used in order to obtain an opposite phase signal.

Reference numeral 120 denotes a variation of bias current supplied to the laser diode 34, and reference numeral 122 denotes a variation of the power of a carrier beam supplied from the laser diode to the intensity modulator 104'. When the carrier beam is modulated based on a main signal by the intensity modulator 104', the waveform of an output beam of the intensity modulator 104' exhibits such a waveform wherein a low frequency signal is superposed with the main signal as denoted by reference numeral 124. Since such an opposite phase signal whose phase is displaced by 180 degrees from the low frequency signal as denoted by reference numeral 126 is supplied from the inverter 42 to a port 80C of the optical amplifier 80, the envelope of the high level and the envelope of the low level of an optical signal outputted from the optical amplifier 80 are fixed as denoted by reference numeral 128. In this manner, suppression of SBS and prevention of waveform interference on the receiving side are possible also with the present embodiment.

Figure 17:
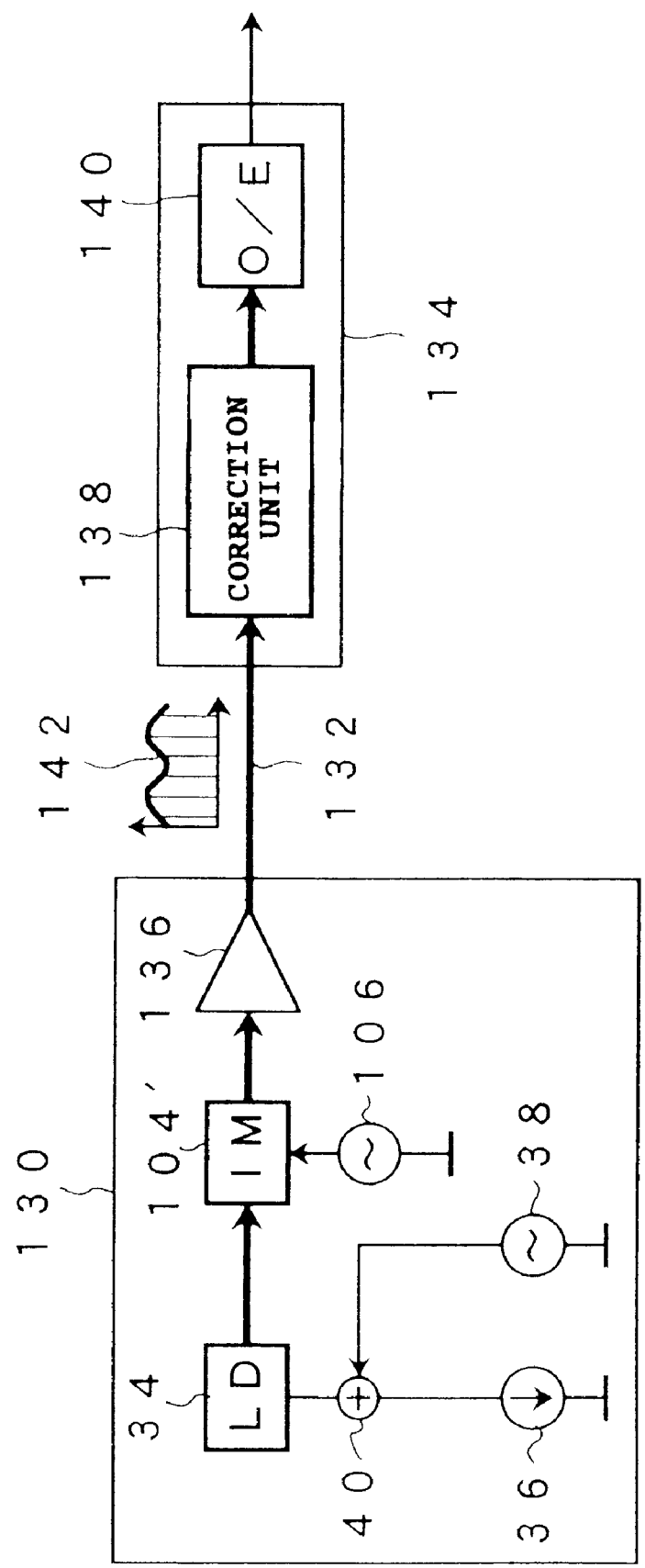
FIG. 17 is a block diagram showing an embodiment of an optical communication system according to the present invention.

Referring to FIG. 17, there is shown an embodiment of an optical communication system according to the present invention. The present system includes an optical transmitter 130 for outputting an optical signal, an optical fiber transmission line 132 for transmitting the optical signal outputted from the optical transmitter 130, and an optical receiver 134 for receiving the optical signal transmitted by the optical fiber transmission line 132. The optical transmitter 130 has, in order to produce an angle modulated optical signal, similarly to the embodiment of FIG. 16, a laser diode 34, a constant current source 36, a low frequency signal source 38, an adder 40, an intensity modulator 104' and a high frequency signal source 106. The optical transmitter 130 further has an optical amplifier 136 for amplifying the produced optical signal. And, the optical signal outputted from the optical amplifier 136 is sent out into the optical fiber transmission line 132. The optical receiver 134 has a correction unit 138 for canceling intensity modulation of the optical signal arising from angle modulation by the optical transmitter 130, and a photo-electric converter (O/E) 140 for converting the optical signal whose intensity modulation has been canceled by the correction unit 138 into an electric signal.

While, in the preceding embodiments, intensity modulation arising from angle modulation is canceled at the stage of an optical signal outputted from the optical transmitter, in the present embodiment, the optical signal outputted from the optical transmitter 130 has a waveform wherein a low frequency component is superposed with a main signal component as denoted by reference numeral 142. Accordingly, since there is the possibility of waveform interference if this optical signal is directly photo-electrically converted by the optical receiver 134, the correction unit 138 is provided in order to prevent this.

Figure 18:
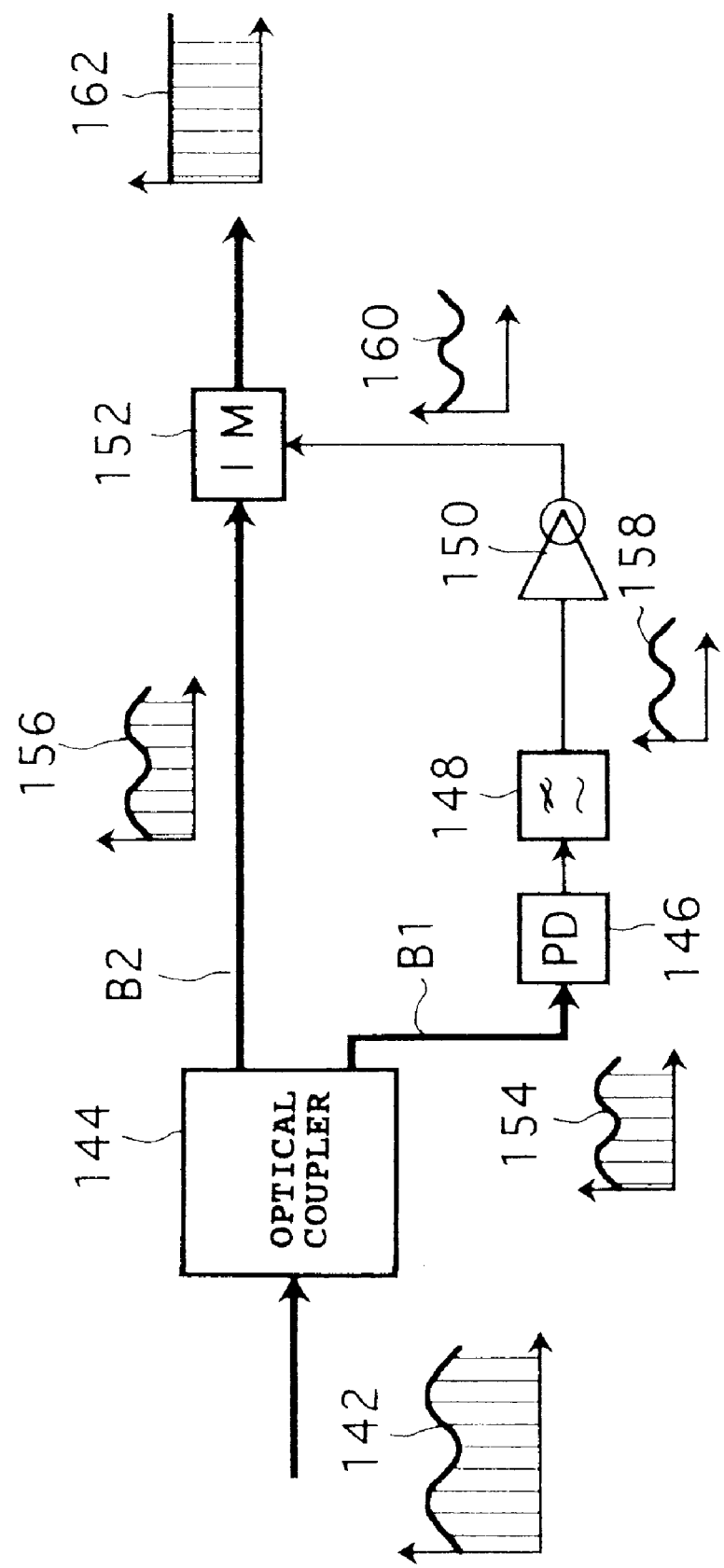
FIG. 18 is a block diagram of a correction unit shown in FIG. 17.

Referring to FIG. 18, there is shown a block diagram of the correction unit 138 of FIG. 17. An optical signal supplied from the optical fiber transmission line 132 is split into beams B1 and B2 by an optical coupler 144. The beam B1 is converted into an electric signal by a photo-detector 146, and this electric signal is supplied to a low-pass filter 148. The low-pass filter 148 is provided to extract a frequency component which is in synchronism with a low frequency signal (from the low frequency signal source 38 of FIG. 17) in an input electric signal. The frequency component extracted is converted into an opposite phase signal by an inverter 150. The beam B2 from the optical coupler 144 is supplied to an intensity modulator 152. Since an opposite phase signal is supplied from the inverter 150 to the intensity modulator 152, intensity modulation arising from angle modulation by the optical transmitter 130 (refer to FIG. 17) is canceled by the intensity modulator 152 so that an optical signal of which the envelope of the high level and the envelop of the low level are both fixed is obtained.

Accordingly, when a main signal is reproduced by the photo-electric converter 140 of FIG. 17, waveform interference is prevented and a good eye opening can be obtained.

It is to be noted that, in FIG. 18, reference numerals 154 and 156 denote the waveforms of the beams B1 and B2, respectively, reference numeral 158 denotes the waveform of the frequency component extracted by the low-pass filter 148, reference numeral 160 denotes the waveform of the opposite phase signal supplied from the inverter 150 to the intensity modulator 152, and reference numeral 162 denotes the waveform of the optical signal wherein intensity modulation arising from angle modulation is canceled.

Figure 19:
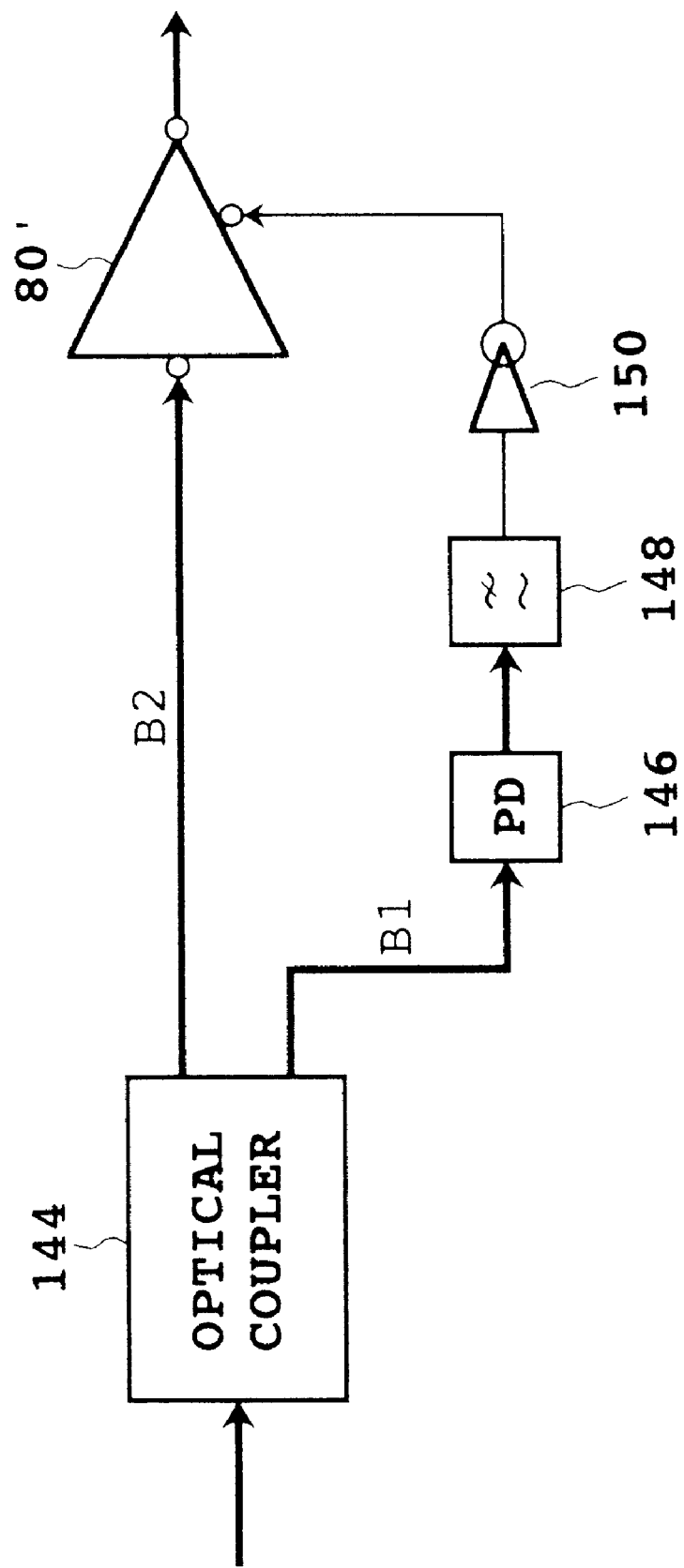
FIG. 19 is another block diagram of the correction unit shown in FIG. 17.

Referring to FIG. 19, there is shown another block diagram of the correction unit 138 of FIG. 17. This correction unit includes an optical amplifier 80' having a variable gain in place of the intensity modulator 152 of FIG. 18. The gain of the optical amplifier 80' is varied based on the opposite phase signal outputted from the inverter 150. Consequently, intensity modulation arising from angle modulation by the optical transmitter 130 (refer to FIG. 17) is canceled, and waveform interference is prevented. In the present embodiment, the optical amplifier 80' provides a gain to the optical signal, and as a result, the amplified optical signal is inputted to a photo-electric converter 140 (FIG. 17). Consequently, the optical amplifier 80' functions as so-called pre-amplifier, and the reception sensitivity can be raised.

While, in the embodiments of the invention described above, intensity modulation arising from angle modulation is canceled with an opposite phase signal, this is a mere illustration for explaining the best form of the present invention. For example, even where an opposite phase signal whose amplitude is not set to an optimum value is used, intensity modulation arising from angle modulation can be suppressed sufficiently in practical use. In this manner, the present invention is not limited by adoption of a particular opposite phase signal. In other words, even where a signal which is in synchronism with an intensity modulation component but is not opposite in phase to the intensity modulation component or another signal which is not in synchronism with an intensity modulation component is adopted, the intensity modulation component can be suppressed.

What is claimed is:

1. An optical transmitter, comprising:

a light source for outputting a light carrier beam;

an optical modulator for modulating the light carrier beam based on a main signal to produce an optical signal and sending out the optical signal into an optical transmission line;

an oscillator for outputting a low frequency signal having a frequency lower than that of the main signal;

a stimulated Brillouin scattering suppression circuit for frequency or phase modulating the light carrier beam based on the low frequency signal so that a threshold value with which the optical signal undergoes stimulated Brillouin scattering in said optical transmission line may increase; and a superposition circuit for superposing on said main signal a signal for suppressing intensity modulation of the light carrier beam which arises from the frequency or phase modulation.

2. An optical transmitter according to claim 1, wherein said optical modulator comprises an electric field absorption type modulator.

3. An optical transmitter according to claim 2, wherein said electric field absorption type modulator has a characteristic curve wherein an output power decreases as an absolute value of an applied voltage increases and an inclination of the characteristic curve decreases as the absolute value of the applied voltage increases.

4. An optical transmitter according to claim 2, wherein said light source includes a laser diode, and said laser diode is monolithically integral with said electric field absorption type modulator.

5. An optical transmitter according to claim 1, wherein said light source includes a laser diode and means for supplying bias current to said laser diode, and said SBS suppression circuit includes an adder for superposing the low frequency signal with the bias current.

6. An optical transmitter, comprising:

a light source for outputting a light beam into an optical transmission line;

an optical amplifier having a variable gain for amplifying the light beam in accordance with the gain;

an oscillator for outputting a low frequency signal;

a stimulated Brillouin scattering suppression circuit for frequency or phase modulating the light beam based on the low frequency signal so that a threshold value with which the light beam undergoes stimulated Brillouin scattering in said optical transmission line may increase; and a control circuit for controlling the gain of said optical amplifier based on said low frequency signal so that intensity modulation of the optical beam which arises from the frequency or phase modulation may be suppressed.

7. An optical transmitter according to claim 6, further comprising an optical modulator for modulating the light beam based on a main signal, said low frequency signal having a frequency lower than that of the main signal.

8. An optical transmitter according to claim 7, wherein said optical amplifier is operatively connected between said light source and said optical modulator.

9. An optical transmitter according to claim 7, wherein said optical amplifier is operatively connected between said optical modulator and said optical transmission line.

10. An optical transmitter according to claim 6, wherein said control circuit includes an inverter for producing an opposite phase signal having an opposite phase to that of the low frequency signal.

11. An optical transmitter according to claim 10, wherein said optical amplifier comprises a doped fiber doped with a rare earth element, a laser diode for receiving bias current and outputting pump light, and an optical circuit for supplying the pump light to said doped fiber, and said control circuit further includes a circuit for superposing the opposite phase signal with the bias current.

12. An optical transmitter according to claim 10, wherein said optical amplifier comprises a semiconductor optical amplifier chip, and means for supplying bias current to said semiconductor optical amplifier chip, and said control circuit further includes a circuit for superposing the opposite phase signal with the bias current.

13. An optical communication system, comprising:

an optical transmitter for outputting an optical signal;

an optical transmission line operatively connected to said optical transmitter for transmitting the optical signal; and an optical receiver operatively connected to said optical transmission line for receiving the optical signal;

said optical transmitter including an oscillator for outputting a low frequency signal, and an SBS suppression circuit for frequency or phase modulating the optical signal based on the low frequency signal so that a threshold value with which the optical signal undergoes stimulated Brillouin scattering in said optical transmission line may increase, said optical receiver including a correction unit for suppressing intensity modulation of the optical signal which arises from the frequency or phase modulation by said optical transmitter.

14. A system according to claim 13, wherein said correction unit includes means for splitting the optical signal received by said optical receiver into first and second beams, a photo-detector for converting the first beam into an electric signal, means operatively connected to said photo-detector for extracting a frequency component of the electric signal which is in synchronism with the low frequency signal, and means for producing an opposite phase signal having an opposite phase to that of the frequency component.

15. A system according to claim 14, wherein said correction unit further includes an optical modulator for receiving the second beam, and the opposite phase signal is supplied to said optical modulator.

16. A system according to claim 14, wherein said correction unit further includes an optical amplifier for receiving the second beam, and a gain of said optical amplifier is varied in accordance with the opposite phase signal.

17. An optical transmitter, comprising:

a light source for outputting a light carrier beam;

an optical modulator for modulating the light carrier beam based on a main signal to produce an optical signal and sending out the optical signal into an optical transmission line;

an oscillator for outputting a low frequency signal having a frequency lower than that of the main signal;

a stimulated Brillouin scattering suppression circuit for frequency or phase modulating the light carrier beam based on the low frequency signal so that a threshold value with which the optical signal undergoes stimulated Brillouin scattering in said optical transmission line may increase; and a superposition circuit for superposing on said main signal a signal for suppressing intensity modulation of the light carrier beam which arises from the frequency or phase modulation, said signal having a phase opposite to that of said low frequency signal.

* * * * *